United States Patent
Estey et al.

[11] Patent Number: 6,127,637
[45] Date of Patent: *Oct. 3, 2000

[54] DISCONNECT FEATURE FOR INTERRUPTER

[75] Inventors: John W. Estey, Glenview; John C. Opfer, Chicago, both of Ill.

[73] Assignee: S&C Electric Co., Chicago, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/999,078

[22] Filed: Dec. 29, 1997

[51] Int. Cl.⁷ .................................................. H01H 33/53
[52] U.S. Cl. ..................................... 200/48 P; 200/50.38
[58] Field of Search .................. 200/48 P, 48 V, 200/50.32, 50.34, 50.38, 50.39; 218/7, 3

[56] References Cited

U.S. PATENT DOCUMENTS

| | | |
|---|---|---|
| Re. 27,625 | 4/1973 | Weston . |
| 2,101,430 | 12/1937 | Goldbert et al. ............... 200/50.34 |
| 2,354,991 | 8/1944 | Gussow et al. ............... 200/48 P |
| 2,658,976 | 10/1953 | Hoye . |
| 2,914,707 | 11/1959 | Timmerman ............... 200/50.39 X |
| 3,163,736 | 12/1964 | Mikos et al. . |
| 4,090,051 | 5/1978 | Frink et al. . |
| 4,541,033 | 9/1985 | Saito . |
| 4,644,113 | 2/1987 | Huang ............... 200/50.38 X |
| 4,677,262 | 6/1987 | Ramos et al. . |
| 4,752,859 | 6/1988 | Chabala et al. . |
| 5,059,753 | 10/1991 | Hamm . |
| 5,091,616 | 2/1992 | Ramos et al. . |
| 5,493,090 | 2/1996 | Vestner et al. . |
| 5,594,610 | 1/1997 | Robirds et al. . |

OTHER PUBLICATIONS

Joslyn literature on "Auto master" with "Cone Break"™ Isolaing Switch, p. 7 (only page available) no date.

*Primary Examiner*—Renee Luebke
*Attorney, Agent, or Firm*—James V. Lapacek

[57] ABSTRACT

A disconnect feature is provided for a circuit interrupter that is conveniently incorporated with the circuit interrupter. The disconnect feature is operable between closed and open positions, providing a visible open gap in the open position. The disconnect feature includes a pivotally mounted contact arrangement that is supported with respect to the circuit interrupter. The pivotally mounted contact arrangement cooperates with an interengaging contact carried by a contact terminal of the circuit interrupter. In specific arrangements, interlock features are provided to disable operation of the circuit interrupter when the disconnect feature is moved out of the closed position. In one arrangement, the disconnect feature is blocked from operation until the circuit interrupter is operated to an open circuit position.

4 Claims, 5 Drawing Sheets

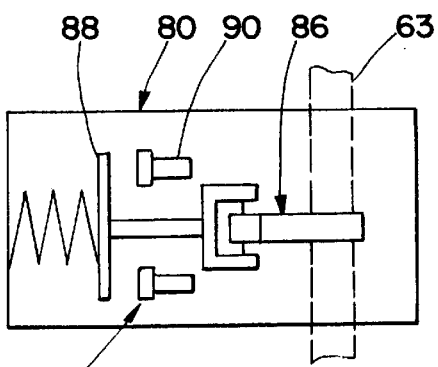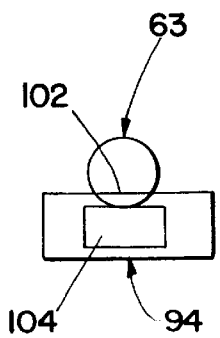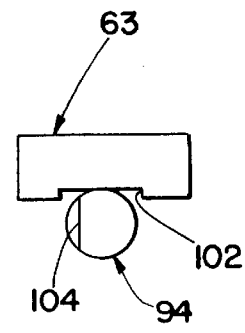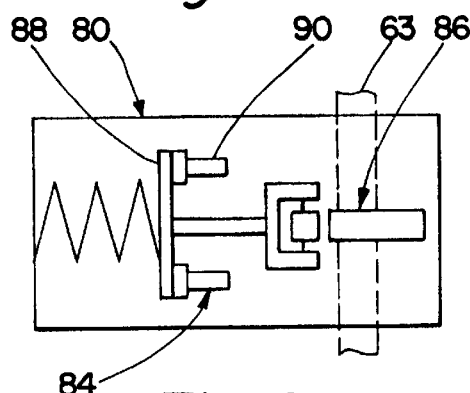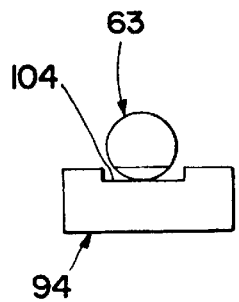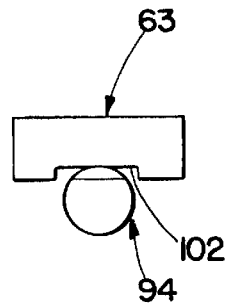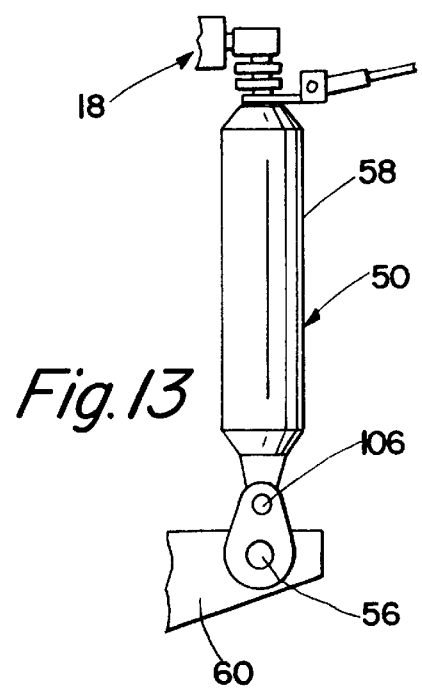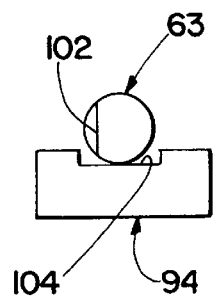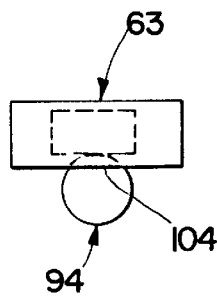

DISCONNECT FEATURE FOR INTERRUPTER

BACKGROUND OF THE INVENTION

1. Field of the Invention

The present invention relates generally to the field of electrical circuit interrupters for electrical power transmission and distribution, and more particularly to a disconnect feature for a circuit interrupter.

2. Description of the Related Art

Various circuit interrupters are known for the electrical power transmission and distribution field. These circuit interrupters are typically installed on a multi-phase line and are either multi-pole gang-operated assemblies or individually operated for each phase. Operation is through an operating mechanism that is manually and/or automatically operated. Further, some circuit interrupters are load interrupter switches that are capable of being opened while load current is flowing through the switch while other circuit interrupters are capable of interrupting fault currents. Additionally, see U.S. Pat. Nos. 5,493,090, 5,059,753, 5,091,616, 4,752,859, 4,677,262, 4,541,033, 4,090,051, 3,163,736, 2,658,976, and U.S. Pat. No. Re. 27,625. While the aforementioned U.S. Pat. No. 5,059,753 is characterized as a recloser, the remaining patents include disconnect features to provide a visible gap, the disconnect feature being operable either as part of the circuit-interrupting process or being separately available after circuit interruption.

While the prior art arrangements may be useful to provide switches with various features, these prior arrangements do not provide a convenient and simple disconnect feature for circuit interrupters.

SUMMARY OF THE INVENTION

Accordingly, it is a principal object of the present invention to provide a disconnect feature for a circuit interrupter It is another object of the present invention to provide a disconnect feature for a circuit interrupter which is conveniently incorporated into existing circuit-interrupter configurations.

It is a further object of the present invention to provide a circuit interrupter and disconnect combination wherein the disconnect feature is supported in common with the circuit-interrupter.

These and other objects of the present invention are efficiently achieved by the provision of a disconnect feature for a circuit interrupter that is conveniently incorporated with the circuit interrupter. The disconnect feature is operable between closed and open positions, providing a visible open gap in the open position. The disconnect feature includes a pivotally mounted contact arrangement that is supported with respect to the circuit interrupter. The pivotally mounted contact arrangement cooperates with an interengaging contact carried by a contact terminal of the circuit interrupter. In specific arrangements, interlock features are provided to disable operation of the circuit interrupter when the disconnect feature is moved out of the closed position. In one arrangement, the disconnect feature is blocked from operation until the circuit interrupter is operated to an open circuit position.

BRIEF DESCRIPTION OF THE DRAWING

The invention, both as to its organization and method of operation, together with further objects and advantages thereof, will best be understood by reference to the specification taken in conjunction with the accompanying drawing in which:

FIGS. 5 and 6 are elevational views illustrating the details of an interlock arrangement of the disconnect feature of FIGS. 1–4;

FIGS. 7, 9 and 11 are plan views of three respective operating positions of an alternate interlock arrangement for the disconnect feature of FIGS. 1–4, FIG. 7 depicting a disconnect operating shaft in a closed position and a manual handle in a closed position, FIG. 9 depicting the disconnect operating shaft closed and the manual handle open, and FIG. 11 depicting the disconnect operating shaft open and the manual handle open;

FIGS, 8, 10 and 12 are right-side elevational views of FIGS. 7, 9 and 11 respectively; and FIG. 13 is an elevational view of an alternate arrangement for the movable disconnect structure of FIGS. 1–4.

DETAILED DESCRIPTION

Figure 1:
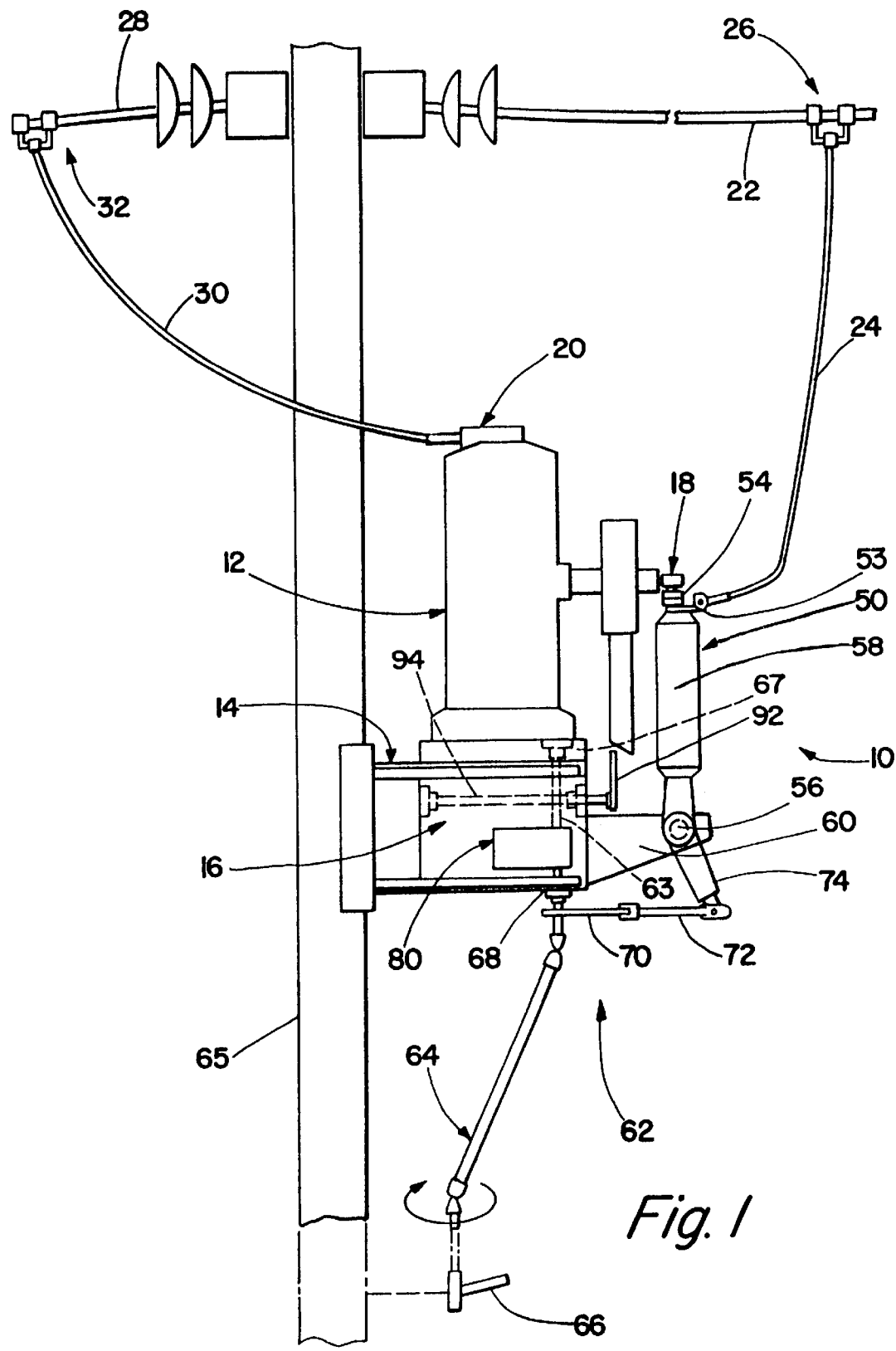
FIGS. 1 and 2 are elevational views of a disconnect feature in accordance with the present invention incorporated with an illustrative circuit interrupter, and depicting the disconnect feature in respective closed and open operating positions.

Referring now to FIGS. 1–4, in accordance with the principles of the present invention, a disconnect feature 10 is provided for a circuit-interrupting device, e.g. the illustrative interrupter 12, which, in a specific application is operable at medium-voltages for electrical power distribution systems in the 2–34.5 kv range. The interrupter 12 includes a support housing 14 which encloses an operating mechanism generally referred to at 16 (FIGS. 1 and 2) for operating the interrupter 12 between open and closed positions to either break or make an electrical circuit path between a first contact terminal 18 and a second contact terminal 20. For example, as shown in FIG. 1, the first contact terminal 18 is connected to a power line 22 via a flexible conductor 24 and a line connection device, for example, a saddle clamp 26 as shown. Similarly, the second contact terminal 20 is connected to a power line 28 via a flexible conductor 30 and a line connection device, for example, a saddle clamp 32. Thus, operation of the interrupter 12 makes or breaks the electrical circuit path between the power lines 22 and 28. As illustrated, the distribution circuit is a typical multi-phase configuration with one interrupter 12 associated with each of the phases, e.g. a, b, c.

Figure 2:
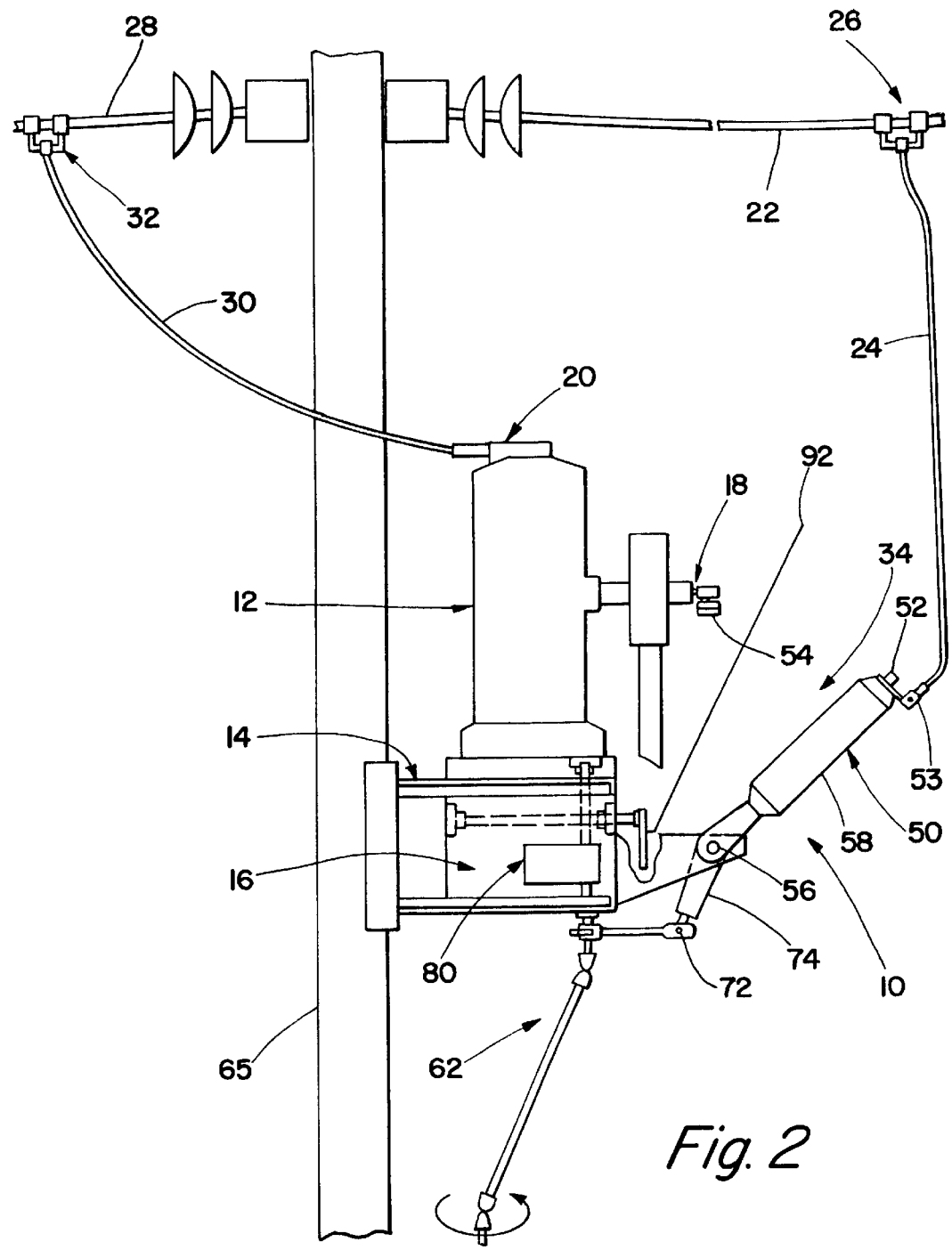

In accordance with important aspects of the present invention, as shown in FIG. 2, the disconnect feature 10 is provided to establish a visible gap at 34 for each phase between the first contact terminal 18 and the flexible conductor 24 that provides the circuit path to the power line 22. Thus, the visible gap at 34 is provided for troubleshooting and maintenance work in accordance with established work practices and electrical codes. In accordance with the illustrative embodiment, the disconnect feature 10 is provided via a pivotally mounted contact arrangement 50 that carries a first movable disconnect contact 52 (best seen in FIG. 2) that is arranged to cooperate and interengage with a second stationary disconnect contact 54 (best seen in FIG. 2) that is carried by the first contact terminal 18. In a specific arrangement, the disconnect contact 52 includes a rotatable or other flexible contact arrangement 53 to reduce any twisting loads in the flexible cable 24.

In a preferred arrangement, the pivotally mounted contact arrangement 50 is pivotally supported at 56 with respect to the support housing 14 of the interrupter 12. Specifically, the pivotally mounted contact arrangement 50 includes an insulating portion or insulator 58 that electrically insulates the first movable disconnect contact 52 from the point 56 at which the pivotally mounted contact arrangement 50 is supported, e.g. at ground potential. For example, as illustrated in FIGS. 1–4, the pivotally mounted contact arrangement 50 is supported by a bracket 60 that is affixed to and extends from the support housing 14. As illustrated in FIGS. 1–4, the disconnect feature 10 is operable via an operating linkage 62 to pivot the pivotally mounted contact arrangement 50 between the closed position of FIGS. 1 and 3 and the open position of FIGS. 2 and 4. The illustrative operating linkage 62 of FIGS. 1–4 includes a lower operating linkage 64 which is rotatable by an operating handle or the like at 66. In the illustrative arrangement, the upper end of the operating linkage 62 is supported about an operating shaft 63 at the upper end at 67, 68 with respect to the support housing 14 and at a lower portion with respect to an illustrative utility pole 65. Operating links 70, 72 of the operating linkage 62 are interconnected and driven by the lower operating linkage 64 to drive a crank arm 74 which is attached to and rotates an operating member 78 that in turn is attached to pivot each of the pivotally mounted contact arrangements 50. Thus, the disconnect feature 10 may be characterized as a gang-operated multi-phase switch or disconnect. In another specific arrangement, the operating linkage 62 is operated via a handle that is affixed to the operating member 78 and operable by a hot-stick handling tool or the like.

Figure 3:
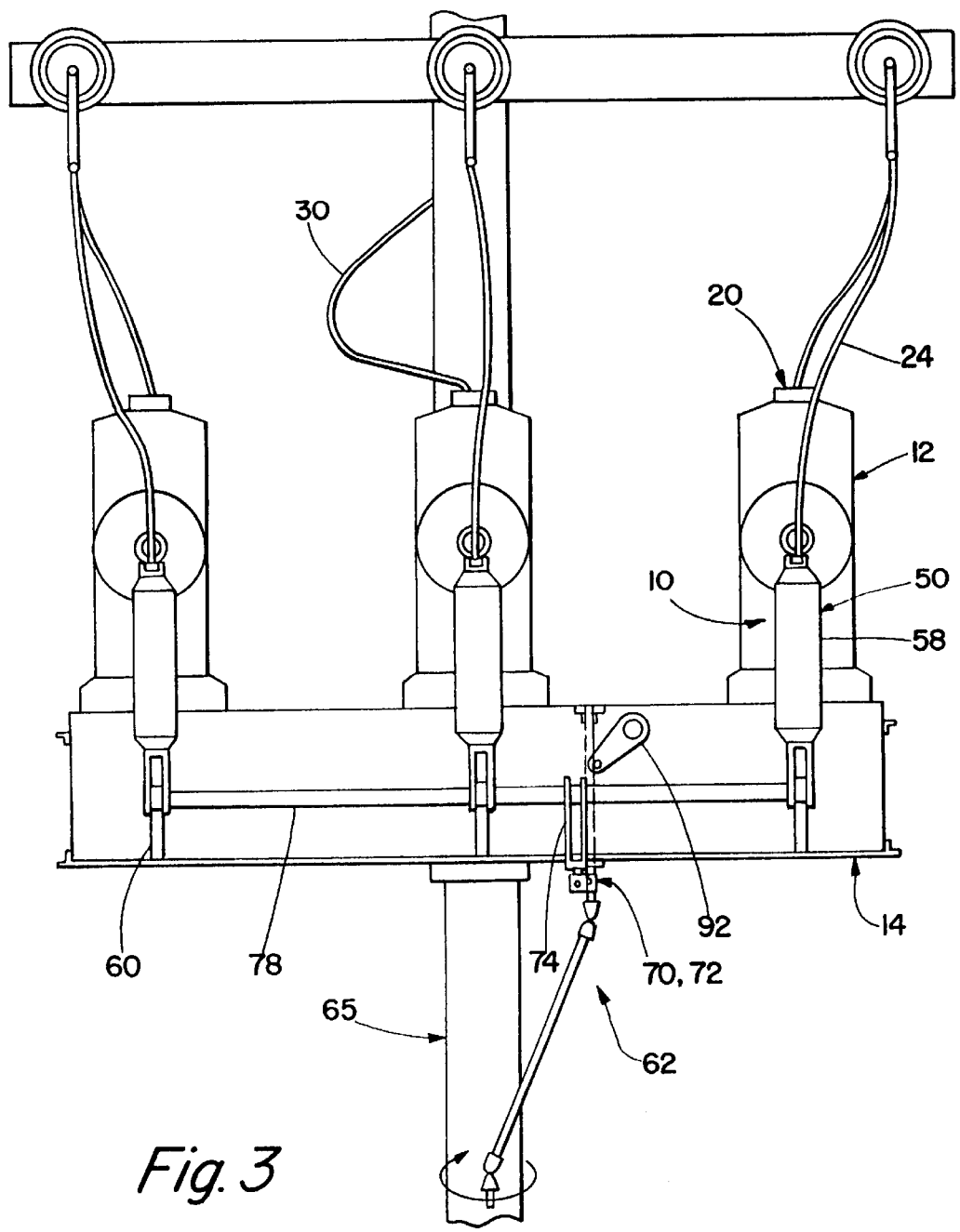
FIGS. 3 and 4 are right-side elevational views of FIGS. 1 and 2 respectively.
Figure 4:
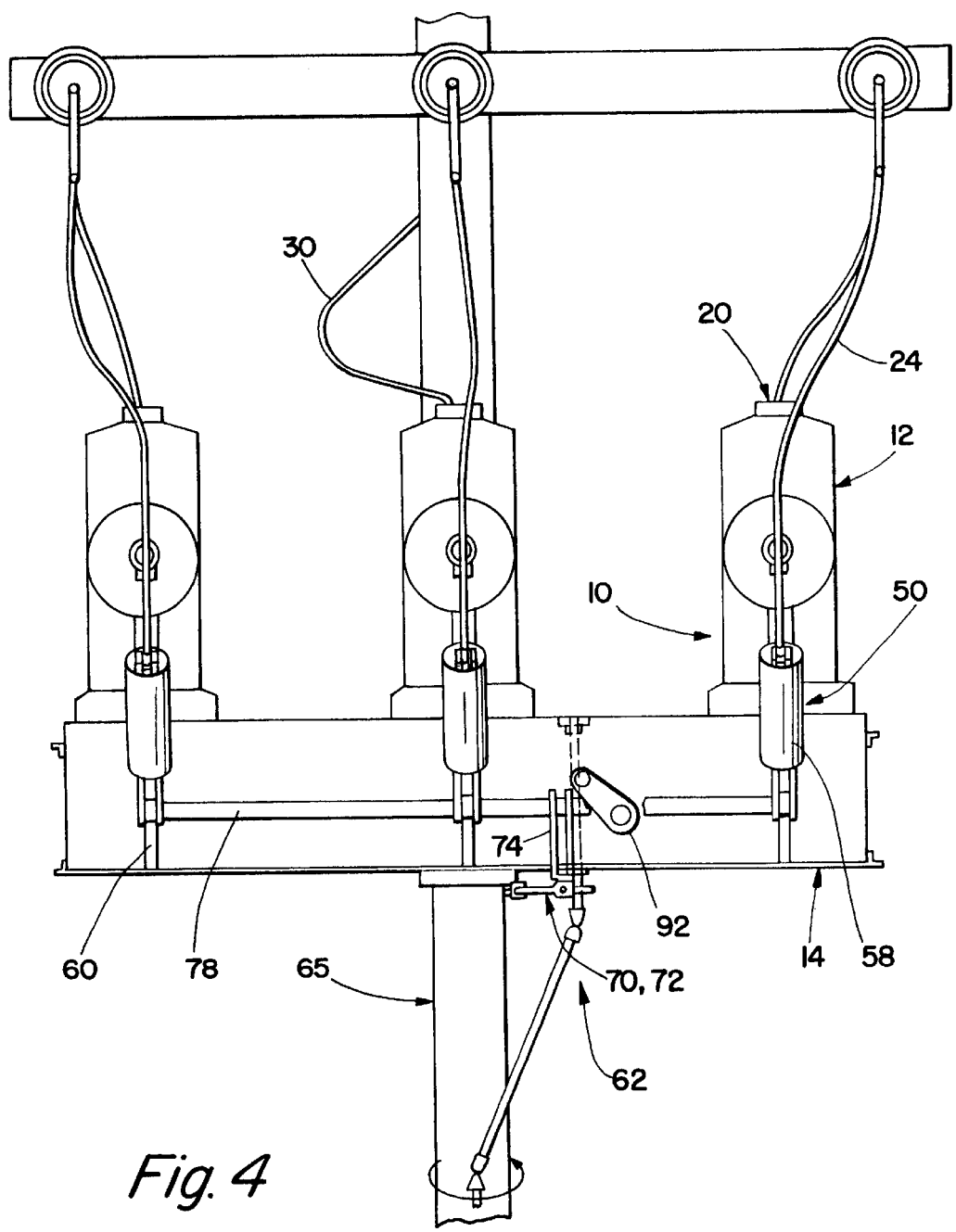

In accordance with other important aspects of a specific embodiment of the present invention and referring additionally now to FIGS. 5 and 6, the disconnect feature 10 includes an interlock arrangement 80 that cooperates with the operating mechanism 16 of the interrupter 12 (e.g. incorporated into the control circuit of the operating mechanism 16) to disable operation of the interrupter when the pivotally mounted contact arrangement 50 is moved out of the closed position of FIGS. 1 and 3. For the specific illustrated interlock arrangement 80, a limit switch 84 is provided that is operated by an operating cam 86 affixed to the operating linkage 62 such that the contacts 88, 90 of the limit switch are closed (FIG. 6) when the pivotally mounted contact arrangement 50 is closed. Thus, whenever the pivotally mounted contact arrangement 50 is moved away from the closed position of FIGS. 1 and 3, the limit switch 84 opens as shown in FIG. 5. Further, until the pivotally mounted contact arrangement 50 is returned to the closed position, the interrupter 12 cannot be operated. Accordingly, circuit closing is always assured to take place in the interrupter such that circuit closing on the contacts 52, 54 is avoided.

In accordance with additional features, in a specific arrangement, the interrupter 12 is operable via a manual handle 92 that extends on a shaft 94 from the operating mechanism 16 and that is operable between open and closed positions. In a specific arrangement, the manual handle 92 is also moved between the open and closed positions whenever the operating mechanism 16 operates the interrupter 12, i.e. whether via local control, automatic, or remote.

In accordance with additional important aspects of the present invention and referring now additionally to FIGS. 7–12, as an alternative or in addition to the interlock arrangement 80, a mechanical interlock arrangement 100 is provided via the configuration of the disconnect operating shaft 63 and the manual interrupting handle shaft 94, i.e. the cooperation, interengagement and interference of cooperating portions of the shafts 63 and 94. In this mechanical interlock arrangement 100, the disconnect feature 10 is blocked from operation, i.e. disabled, whenever the manual handle 92 is in the closed position. Additionally, the manual handle 92 is blocked from operation whenever the disconnect feature 10 is out of the closed position. To accomplish these interlock functions, in a specific arrangement, the disconnect operating shaft 63 in the vicinity of the manual operating handle shaft 94 includes a notch or flat cut-away portion 102. Additionally, the manual operating handle shaft 94 in the vicinity of the disconnect operating shaft 63 includes a notch or flat cut-away portion 104.

With additional reference to FIG. 13 and considering an alternate arrangement, the pivotally mounted contact arrangement 50 includes an additional pivot point at 106 above the pivot point 56. This results in a so called "broken back" contact arrangement which provides additional contact retention forces in the closed position.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A circuit interrupter configuration with a disconnect function comprising:

circuit interrupter means comprising a support housing and means for opening and closing the electrical path between first and second circuit terminals;

disconnect means being pivotally supported by and with respect to said support housing of said circuit interrupter means and being movable between open and closed positions for selectively engaging with and providing an electrical circuit path to one of said first and second circuit terminals, said disconnect means comprising a pivotally mounted insulator and a contact arrangement affixed to said pivotally mounted insulator and arranged for engagement with said one of said first and second circuit terminals;

flexible connection means electrically connected to said contact arrangement for providing a movable connection to a conductor; and means responsive to movement of said disconnect means away from said closed position and toward said open position for providing disabling of the operation of the circuit interrupter.

2. A circuit interrupter configuration with a disconnect function comprising:

circuit interrupter means comprising a support housing and means for opening and closing the electrical path between first and second circuit terminals;

disconnect means being pivotally supported by and with respect to said support housing of said circuit interrupter means and being movable between open and closed positions for selectively engaging with and providing an electrical circuit path to one of said first and second circuit terminals, said disconnect means comprising a pivotally mounted insulator and a contact arrangement affixed to said pivotally mounted insulator and arranged for engagement with said one of said first and second circuit terminals;

flexible connection means electrically connected to said contact arrangement for providing a movable connection to a conductor; and means for preventing pivoting of said disconnect means out of said closed position when the circuit interrupter is in a closed mode.

3. The circuit interrupter configuration of claim 2 further comprising means for pivoting said pivotally mounted insulator between first and second positions.

4. A kit of component parts being assembled to provide a disconnect function for a circuit interrupter that includes first and second circuit terminals, the kit comprising support means adapted to be affixed to the circuit interrupter, disconnect means being pivotally supported on said support means and movable between open and closed positions for selectively engaging with and providing an electrical circuit path to one of the first and second circuit terminals, said disconnect means comprising a pivotally mounted insulator and a contact arrangement affixed to said pivotally mounted insulator and arranged for engagement with said one of said first and second circuit terminals, and flexible connection means electrically connected to said contact arrangement for providing a movable connection to a conductor.

* * * * *